March 12, 1963 — L. A. MOE — 3,081,429
INGREDIENT CONTENT DETERMINATION
Filed April 2, 1959
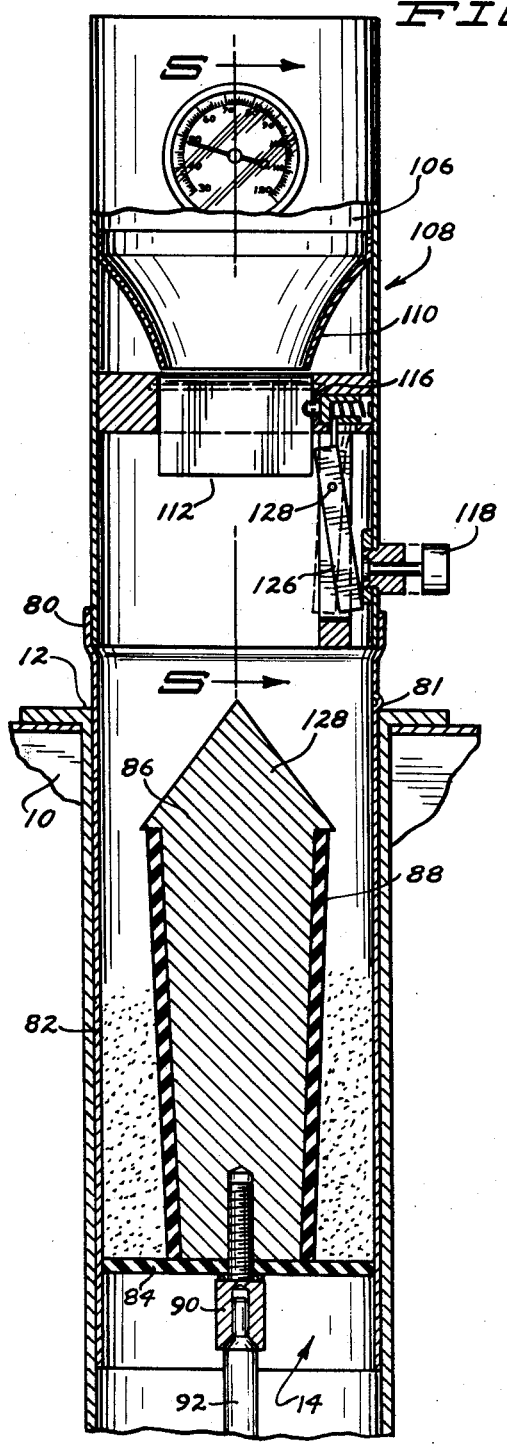
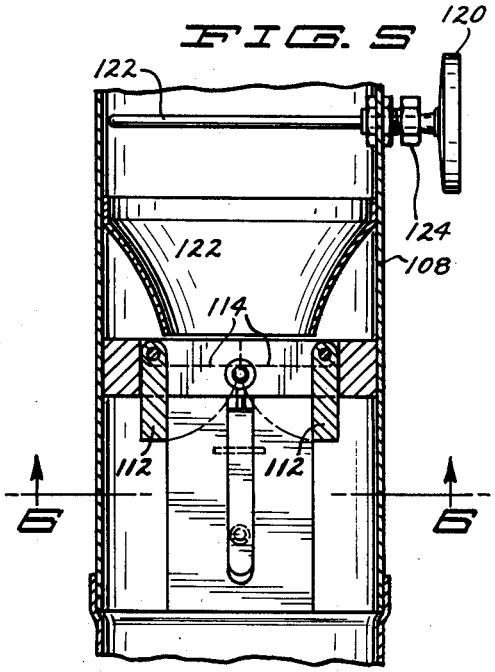
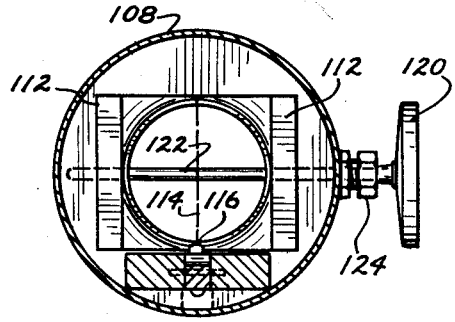
INVENTOR
LOWELL A. MOE
BY Carlsen & Hayle
ATTORNEYS March 12, 1963 L. A. MOE 3,081,429
INGREDIENT CONTENT DETERMINATION
Filed April 2, 1959 4 Sheets-Sheet 4

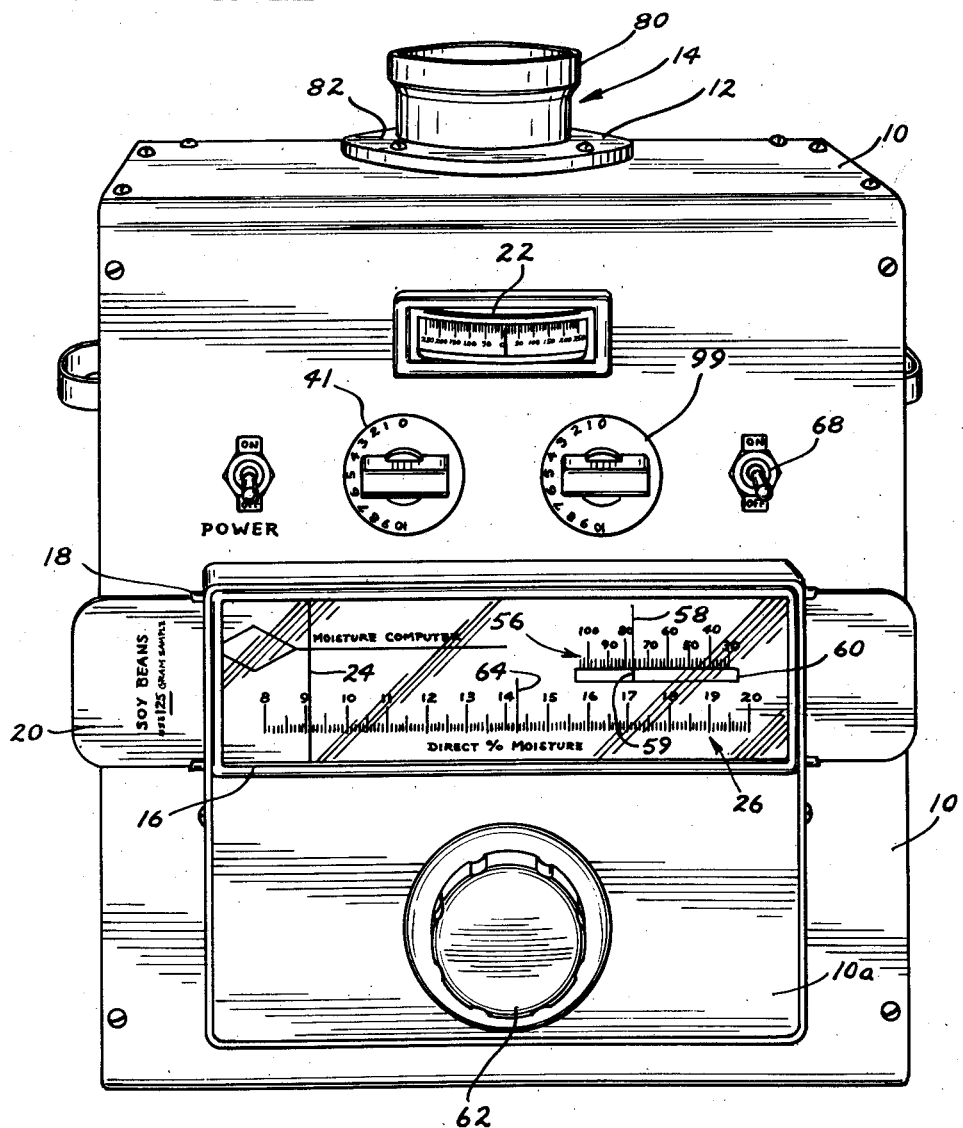

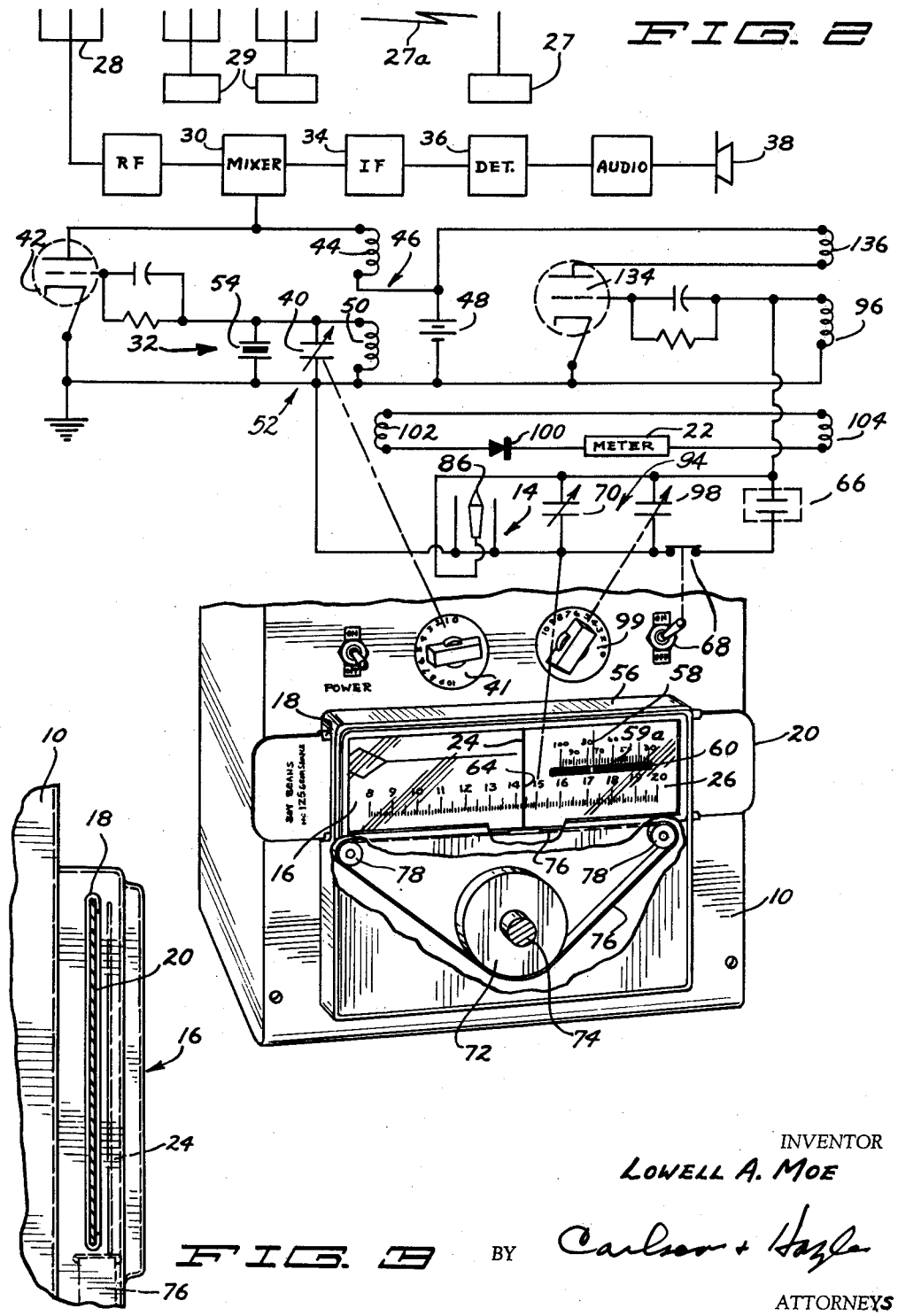

INVENTOR
LOWELL A. MOE
BY Carlsen + Hoyle
ATTORNEYS

United States Patent Office 3,081,429
Patented Mar. 12, 1963

3,081,429
INGREDIENT CONTENT DETERMINATION
Lowell A. Moe, Minneapolis, Minn., assignor to F. H. Peavey & Company, Minneapolis, Minn., a corporation of Minnesota
Filed Apr. 2, 1959, Ser. No. 803,727
5 Claims. (Cl. 324—61)

This invention relates to improvements in meters of the electrical reactance type and in methods of determining the content or percent amount of an ingredient, for example moisture, contained in a sample of material and more particularly to apparatus and methods of providing an accurate and consistent temperature compensated indication of the ingredient amount. This invention further facilitates interchangeability between a plurality of meters of detachable electrodes used in contact with the material being examined. In practice this invention has been successfully utilized in accurately and consistently providing temperature compensated moisture content indications of various grains, corn, metallic ores and the like.

The principle under which this invention operates has been well known for some time and it has been the usual practice in prior art to ignore coaction between certain critical variables in making measurements resulting in readings which may vary from one measurement to the next. It is well known that the moisture content of materials as well as the content of certain other ingredients such as oils, etc., in a material have a direct and substantial effect on the dielectric qualities of the material. By measuring the capacitance of the material by placing same between two electrodes the dielectric quality and thus the ingredient amount therein can be determined. One of the electrodes is preferably electrically insulated from the material to prevent a low electrical resistance between the two electrodes which could adversely affect the capacitance measurement.

Prior art apparatus and methods employing the above stated principle of operation have often ignored the coaction of variations in temperature and frequency of electrical signal imposed across the electrodes, although providing fairly accurate readings, limit the consistent accuracy of these devices. Other prior art devices designed to be utilized for testing a plurality of dierent materials for moisture content and the like have resorted to charts to convert a dial reading to the moisture content reading. Additionally as various meters are used over a period of time electrical components and critical metal parts in the electrodes may vary resulting in a variation of readings between different meters employing the same type apparatus.

Contrary to some prior art teachings which either ignored or inferred temperature variations of the sample were unimportant, it was discovered that sample temperature plays a vary important role in accurately determining ingredient content by the electrical reactance method even at radio frequencies of about 20 megacycles. For example, in testing soy beans for moisture content in using a 125 gram sample a decrease of one degree Fahrenheit has resulted in an increased reading of about 0.1 percent moisture. Similarly at about 20 megacycles a frequency deviation of 0.5 megacycle has caused a reading deviation of 0.1 percent ingredient content from the "true" reading. It is apparent that since at least two variables are critical that variations of both may cancel errors and that accurate and consistent readings cannot be obtained unless both variables are either controlled or properly analyzed and compensated therefor.

According to this invention a central extremely stable frequency source is utilized, such as the radio frequency emissions from radio station WWV of the National Bureau of Standards, to provide a single reference frequency for use by all meters. Accordingly the local oscillator of a radio receiver is utilized to provide a reference frequency to a resonant circuit in the meter which is connected to measure the capacitance of the ingredient. The just described arrangement provides the best available frequency reference to all meters but still utilizes a very small amount of equipment to provide same resulting in low cost and increased portability.

A detachable and interchangeable test cell is utilized with the meter without requiring exacting and tedious standardization of each cell to a particular meter circuit. Each meter is provided with a stable simulated load insertable during calibration thereof in parallel circuit relation with the test cell to provide electrical calibration of each cell as it is inserted into the meter. In this manner small capacitance variations from one test cell to another are compensated for in the meter thereby providing the same effective empty cell capacitance to the resonant circuit regardless of what capacitance the empty test cell presents. Therefore, it is seen that each meter utilizes exactly the same reference frequency in relation to the same effective empty cell capacitance resulting in a capacitance variation in the resonant circuit being the same for one sample regardless of which meter is utilized.

An additional variation in readings may be caused by the manner in which the material to be tested is located between the electrodes, for example in extremely granular material the packing, bushel weight variations and the disposition of the material with respect to the electrodes affect the actual capacitance provided between the electrodes by the material. This variation is circumvented by this invention in providing a coaxial test cell having bushel weight compensated shaped electrodes and a material insertion means for dispensing a predetermined weight of material uniformly and quickly between the electrodes. Therefore the established meter accuracy is preserved.

Compensation in the reading for temperature variations in the material being tested is provided by a relative adjustment between a dial card and a pointer connected to the resonant circuit for tuning same, providing a linear adjustment between the pointer and dial corresponding to the difference in the material temperature and the temperature then indicated on the dial. This type of correction for temperature is possible since the material temperature linearly affects the capacitance, i.e., dielectric quality, of the material under test. Therefore, for the same variation in capacitance different amounts of moisture (ingredient content) are indicated at different material temperatures. A variation in temperature from 30° F. to 100° F. for soy beans means a variation of about 3.5% in moisture content for the same variation in capacitance.

Additionally different materials and different ingredients provide different capacitance variations with temperature. Therefore, in order to obtain maximum capacitance variation for all materials and ingredients it is necessary to initially calibrate the meter for each ingredient and material to be tested with an accepted standard. This invention provides a detachable dial card for each ingredient in each material to be tested which is movably inserted in the meter, the meter and test cell are calibrated to the inserted card at a predetermined temperature and then the measurement is made to provide a temperature compensated indication of ingredient content in the sample.

Accordingly it is an object of this invention to provide ingredient content meters which operate with a single reference frequency source.

It is another object of this invention to provide ingredient amount determining apparatus of the electrical measurements type wherein the ingredient amount indication is integrally adjusted to indicate a temperature compensated reading.

It is a further object of this invention to provide ingredient determining apparatus of the electrical measurements type and methods of operating same wherein accurate temperature compensated readings may be taken from at least 30° F. through 100° F. sample temperature.

It is still another object of this invention to provide calibration means in an ingredient meter wherein the meter, the container or cell wherein the material to be measured is located and the dial are calibrated to compensate for electrical changes in the meter and cell.

It is still a further object of this invention to provide an ingredient content meter having improved loading means for inserting a predetermined weight of material to be examined between two electrodes for determining the dielectric qualities of the material.

It is another object of this invention to provide an ingredient content meter with an improved detachable test cell.

It is a still further object of this invention to provide ingredient content meters with interchangeable temperature compensating dials for indicating directly the ingredient content.

These and other more detailed and specific objects will be disclosed in the course of the following specification, reference being had to the accompanying drawings, in which:

FIG. 1 is a front elevational view of an exemplary meter built according to this invention with an uncompensated temperature uncompensated moisture content reading indicated thereon.

FIG. 2 is a schematic diagram of the meter circuits and the operation of the indicator assembly with a dial card being in a "calibrate position."

FIG. 3 is a partial enlarged side elevational view of the FIG. 1 meter looking from the left to illustrate the dial slide construction.

FIG. 4 is a fragmentary sectional view of a detachable test cell and material insertion can shown mounted in the FIG. 1 meter.

FIG. 5 is a vertical sectional view taken on lines 5—5 of FIG. 4.

FIG. 6 is an axial view taken on lines 6—6 in FIG. 5.

Figure 7:
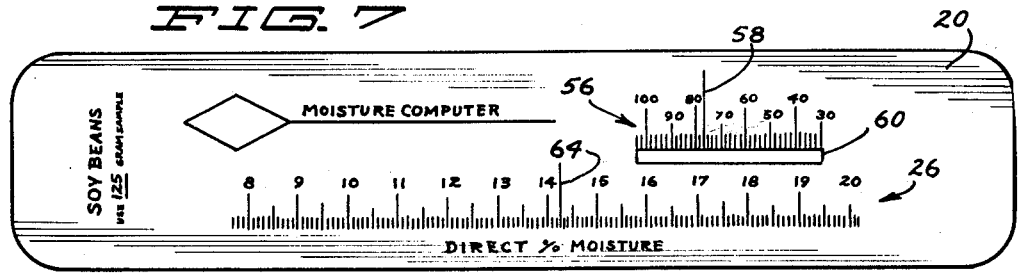
FIG. 7 is a plan view of an exemplary detachable dial card for use with the FIG. 1 meter.

With reference now to the drawings like numbered parts in the various figures denote like parts wherein numeral 10 (FIG. 1) denotes the housing containing an exemplary ingredient content meter and including upright tubular test cell receptacle 12 extending slightly above the meter for receiving a tubular detachable coaxial test cell 14 (FIG. 4). On the front panel 10a of the meter there is window 16 behind which there is a dial card holding channel or slide 18 which extends from opposing sides of housing 10 for receiving from outside the housing detachable and interchangeable dial cards 20. Disposed immediately above window 16 there is meter movement 22 used as hereinafter explained to detect the circuit condition wherein pointer 24 is indicating on graduated scale 26 of card 20 the ingredient content in the material being tested or examined.

To place the meter into operation the power is turned on, then the meter is calibrated to an extremely accurate and stable frequency source 27, such as radio station WWV which continuously emits radio signals receivable throughout the world as indicated by jagged line 27a. As seen schematically in FIG. 2 the meter is preferably provided with a superheterodyne radio receiver pretuned to receive a signal from WWV. Half-wave doublet antenna 28 receives the WWV signal which is RF amplified and fed into mixer 30 in the usual manner. Other ingredient content determination meters 29 similar to the one herein described also simultaneously receive the WWV signal.

In the first embodiment of the invention the receiver was permanently tuned to receive one WWV signal and had a local oscillator providing a local reference frequency having a predetermined frequency relationship with the received signal frequency as will become apparent. In the first embodiment the meter housing 10 was provided with an antenna terminal (not shown) on the rear side for connection to an antenna 28 as indicated schematically in FIG. 2.

Mixer 30 beats the incoming radio signal with the locally generated radio signal from crystal controlled oscillator 32 into IF strip 34 feeding second detector 36 which provides a whistle signal from loudspeaker 38 (located in but not shown in the rear of housing 10) whenever local oscillator 32 drifts from the assigned reference frequency. Trimmer 40 operatively connected to knob 41 (FIG. 1) is used to adjust the oscillator 32 frequency over a very limited range to the assigned reference frequency as indicated by silence from speaker 38. It is understood that a pentagrid converter may be substituted for the illustrated heterodyne first detector (oscillator 32 and mixer 30).

It is seen in FIG. 2 that oscillator 32 is of the grid tickler type having the plate electrode of tube 42 connected through winding 44 of oscillator coil 46 to B battery 48. The positive feedback to the control grid of tube 42 to provide oscillations is through winding 50 of oscillator coil 46 which also is a part of the crystal controlled frequency determining tank circuit 52 having crystal 54 thereacross.

After the local oscillator has been adjustably tuned with WWV the meter is ready to be calibrated to a dial and test cell. Firstly a detachable dial card 20 calibrated for the ingredient and material to be tested is slidably inserted into card slide 18 as best seen in FIGS. 1 and 3. On the upper right hand corner portion of each card there is a graduated temperature scale 56 having a reference temperature mark 58 arbitrarily chosen as 77° F. which is aligned through horizontal narrow slit opening 60 in card 20 with non-reflective mark 59 on a highly reflective background on slide 18 as seen through slit 60. The card 20 is slid in card slide 18 until reference temperature mark 58 is aligned with the mark 59 vertically disposed on slide 18 and visible through slit 60. FIG. 2 shows a highly reflective mark 59a on a dark background of slide 18 which is a preferred embodiment of providing a reference mark on the meter. Knob 62 (FIG. 1) is then turned to drive pointer 24 as hereinbelow described until same coincides with enlarged reference mark 64 on ingredient amount scale 26 as seen in FIG. 2. Mark 64 is located centrally on scale 26 to provide a median content value with which to calibrate the meter. Actually this mark corresponds to and is indicative of the capacitance a median amount of ingredient in a material as indicated on the dial card would provide in a test cell of the structure hereinafter referred to and when measured at the reference temperature of 77° F. The capacitance value was chosen to be the same for all materials to be tested and is provided in the meter in the form of a reference impedance 66 (an electrical reactance) which may be connected across cell 14 to simulate material therein by closing calibration switch 68.

Variable capacitor 70 which is mechanically connected to pointer 24 is adjusted to mark 64 by knob 62 driving drum 72 mounted on shaft 74 which is rotatably mounted in housing 10 and is connected to the rotor plates (not shown) of variable capacitor 70. It is understood that capacitor 70 is constructed of two sets of relatively movable interleaved capacitor plates in a manner similar to the construction of a radio receiver tuning capacitor. Dial cord 76 is wrapped around drum 72 several times for movement therewith, the cord being movably supported on the opposite side of the meter housing 10 by idler wheel 78. Pointer 24 is firmly clipped to cord 76 by a spring clip integral with the pointer as seen in FIG. 2 and moves horizontally with the cord as drum 72 is rotated by knob 62.

Next a test cell is slidably inserted into receptacle 12 and has a snug fit for good electrical contact therewith as best seen in FIG. 4. Cell 14 has radially enlarged upper lip 80 radially outwardly extending detent 81 for supporting cell 14 in the illustrated position. The outside tubular casing 82 of the cell forms the outer coaxial electrode, is in good electrical contact with receptacle 12 and has insulating spacer 84 preferably of plastic closing one end thereof. Spacer 84 also supports central axially extending electrode 86 having insulation 88 thereabout for preventing shorting between electrodes 82 and 86. Screw 90 is inserted through an aperture in spacer 84 and screwed tightly into electrode 86 for supporting same and has a circularly recessed head for engaging center connector 92 for forming an electrical contact therewith. Connector 92 is stationarily associated with and electrically insulated from housing 10 to provide a signal lead to tuned circuit 94 which includes capacitor 70 and coil 96.

The meter and test cell are calibrated to the dial cord 20 by closing switch 68 to place reference impedance 66 into tank circuit 94 which includes coil 96 and capacitors 70 and 98 together with the test cell 14; then adjusting variable capacitor 98 of circuit 94 by knob 99 until the resonant frequency of circuit 94 is the same as the oscillator 32 frequency. This adjustment provides a median value of capacitance in circuit 94 in a predetermined range of capacitance therein represented by the extremities of graduated scale 26 on card 20.

Frequency synchronism between oscillator 32 and tank circuit 94 is detected by a phase detector comprising the series connected circuit including semi-conductor diode or rectifier 100, meter 22 and coils 102 and 104 which are respectively loosely inductively coupled to coil 50 of oscillator 32 and coil 96 of circuit 94. It is appreciated that the voltages induced in coils 102 and 104 vectorially add to produce a minimum rectified current through meter 92 when the two tuned circuits are in frequency synchronism or are at harmonics. The circuits are constructed to be close to the same frequency. Therefore a current null in meter 22 is indicative of frequency synchronism and thus indicative that test cell 14 and circuit 94 are tuned to the dial card 20 at the frequency of oscillator 32 during the just described calibration procedure. It is to be understood that either of the tuned circuits may be operated at a harmonic, preferably an even harmonic, of the other with satisfactory results.

The ingredient content determining meter is now ready to receive material to be tested as indicated on dial card 20 in card slide 18. A predetermined weight of material from a railway boxcar, truck box, elevator bin or the like is placed in hopper 106 of carrying can 108 which is placed hopper end up into radially expanded lip 80 (FIG. 4) of cell 14. The lower end of hopper 106 has inverted conical sides 110 forming a circular opening in the bottom which are blocked by downwardly swinging weighted doors 112 held in blocking position indicated by dotted lines 114 by spring urged radially outwardly retractile pin 116. Before opening doors 112 by depressing lever button 118 the temperature of the material in hopper 106 is noted on dial 120 of gas operated thermometer having sensing element 122 in hopper 106 and supported on can 108 by threaded sleeve 124 mounted in an aperture on the tubular side wall thereof. As best seen in FIG. 6 the cross sectional axial area of doors 112 is greater than the opening formed by conical section 110 and with the doors 112 in the opened position to pass the material from hopper 106 to cell 14 are radially outward from the opening to provide a truly circular cross sectional passage of material. Therefore when lever button 118 is depressed lever 126 rotates clockwise about pivot 128 engaging and moving pin 116 radially outward thereby releasing doors 112 to quickly fall downwardly out of axial alignment with the opening. The material falls uniformly toward conical upper end 128 of electrode 86 with the apex thereof being centrally axially aligned with the center of the circular opening of hopper 106 thereby dispersing the material radially outwardly and uniformly between electrodes 86 and 82. It is important to accurate measurements that the material be uniformly distributed on the bottom 84 of cell 14 as the material forms in the same manner for each measurement a part of the dielectric, and thus the capacitance, between the cell electrodes and a variation of material distribution in the cell causes a variation of capacitance therein.

An additional feature of the test cell is provided by inwardly radially tapering the walls of electrode 86 toward closed end 84 of cell 14. This tapering compensates for variations of granule sizes, i.e., bushel weight, in affecting the total capacitance in the cell. With a larger volume between electrodes at the bottom of the cell the larger granules are permitted to pack together but still use about 75% of the test cell total volume. With the larger percentage of the volume used and with the permitted packing at least at the cell bottom the air spaces between the granules appear to even out. With the bushel weight compensated test cell only one dial card 20 need be used with various bushel weights or various granularity of non-grain materials to be examined.

After the material has been dumped from can 108 into cell 14 the can may be removed, turned upside down to permit doors 112 to reclose by catching on pin 116 ready for usage with another sample of material.

With the material, such as soy beans, now in the test cell 14 the ingredient to be measured, such as moisture, has varied the total capacitance in cell 14 thereby varying the frequency of circuit 94 resulting in increased current flow through meter 22 being indicated by the meter needle deflecting (not shown). To measure the amount of ingredient in the material knob 62 is rotated moving pointer 24, for example to the 9.1% marker on scale 26 as indicated in FIG. 1, at which point meter 22 again indicates a current null. To accurately determine the point of current null knob 62 is rotated back and forth moving the circuit 94 frequency across the oscillator 32 frequency thereby traversing the current null several times.

Figure 8:
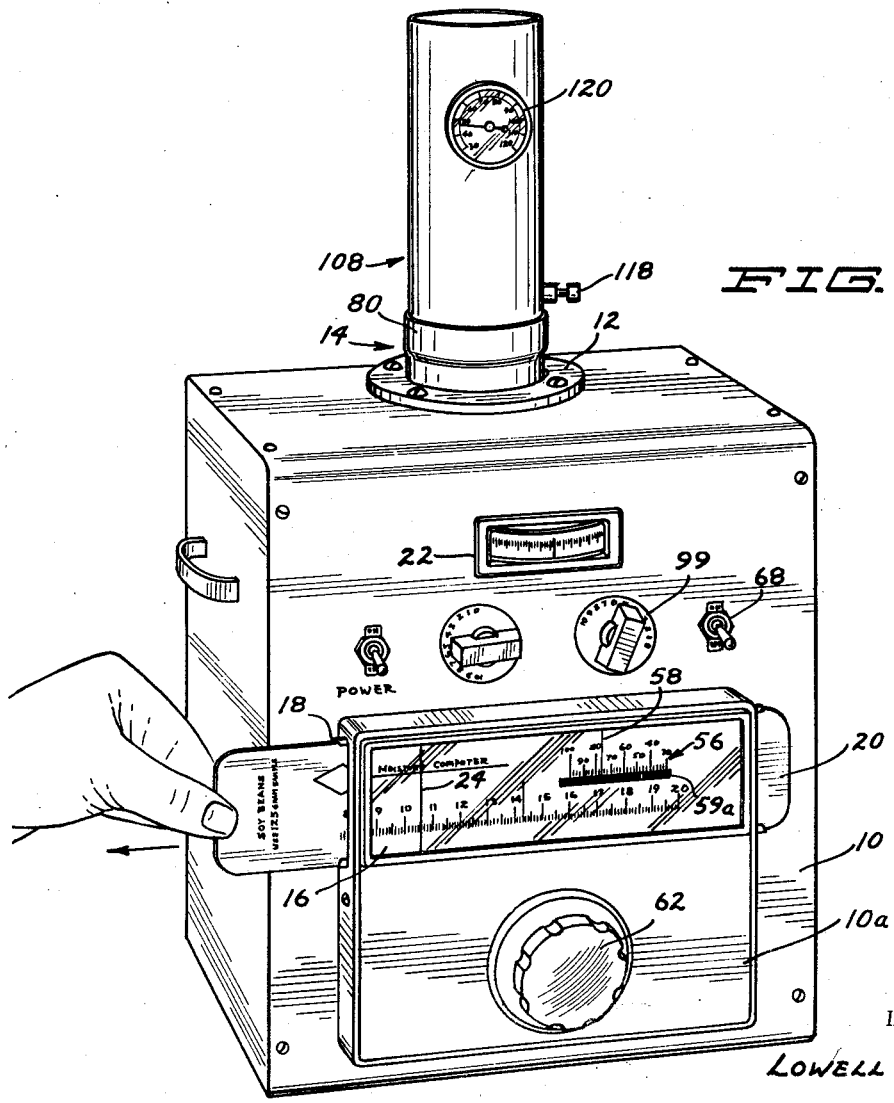
FIG. 8 shows the dial card of FIG. 7 in a "temperature compensated position" indicating the moisture content of material examined by the FIG. 1 meter.

When the current null is so located, card 20 is moved until the temperature graduation indicative of the previously noted material temperature, for example 48° F. is aligned with the vertical highly reflective line 59 as viewed through the horizontal slit 60 and as best shown in FIG. 8. Since pointer 24 is not moved the direct reading of ingredient content (percent moisture) on scale 26 is modified from 9.1% to 10.5% as indicated in FIG. 8. This temperature compensated reading is provided by displacing the scale 26 with respect to pointer 24 a distance equal to the displacement on temperature scale 56 indicative of the temperature differential between the calibration temperature of 77° and the measured material temperature of 48°.

Since variations of capacitance with moisture varies between different materials and additionally the variations of capacitance due to material temperature variations also differ between various materials, a special dial card 20 is prepared for each material with each ingredient to be measured. Therefore the meter and inserted test cell are calibrated to a different dial card each time a different material is inserted into the test cell.

After the above mentioned reading is noted the test cell 14 is removed from receptacle 12 and the material therein removed therefrom and the cell replaced. Alternately, another cell may be inserted in receptacle 12. In any event, the meter should be re-calibrated with an empty test cell to a dial card 20 before another test is made.

As shown in FIG. 2 resonant circuit 94 is the frequency determining circuit of a grid tickler oscillator including vacuum tube 134 being connected to plate coil 136 to B battery 48 and having its control grid coupled to circuit 94. The operation of this oscillator is the same as described for oscillator 32. It is understood that resonant circuit 94 need not form a part of an oscillator as shown, rather it can be used as a filter or impedance variable with frequency as is well known in the art for tuned circuits of the LC tank type.

In applying the just described invention it is apparent frequency variations between a plurality of ingredient meters may result in a substantial variation in the indication of ingredient amount contained in a sample of material. In a large marketing organization obtaining materials from a diversity of sources wherein quality control of the material at the source such as to moisture content is important because of high shipping costs, this invention can provide the necessary source quality control by using the single reference frequency in meters located at each material source. Even if there is a frequency error all meters provide the same error in the same degree which means that the material shipped is still identified relative to other shipments of material without random quality control error.

When using the above described meter in testing material having a temperature radically different from the ambient temperature of the meter for an accurate consistent temperature compensated readings the meter is calibrated prior to bringing the material into the testing area or laboratory. The material to be tested is inserted into a can 108 preferably having the same temperature as the material. The temperature is noted and the material quickly dropped into the test cell; then knob 62 is quickly turned to bring a current null indication on meter 22 before the material temperature in the test cell has had a chance to vary. After the current null is found the dial card 20 is adjusted for temperature compensation.

Alternately the meter may be firstly calibrated, the material temperature noted, the dial adjusted for temperature compensation, the material brought into the testing area and inserted into the test cell 14, then the knob 62 quickly turned to retune the circuit 94 and then the temperature compensated reading taken from dial card 20 as indicated by pointer 24.

In using either of the above methods of performing the steps in making an ingredient content measurement, accurate and consistent readings have been obtained from 30° F. through 100° F. For example frozen corn at 30° F. was examined by a meter and by using the first described method of measurement a reading was obtained from the corn while still frozen within 0.1% of a reading obtained by an accepted standard measuring instrument when the same sample was conventionally measured at room temperature. In other tests using the same methods, durum wheat, oats and western barley among other grains were successfully examined for moisture content at 98° and 100° F. within 0.1% of readings taken by an accepted standard meter when the same samples were later measured at room temperature. In yet other tests too numerous to list herein conducted as the above mentioned tests but at various sample temperatures ranging from 30° through 100° F., the readings were consistently within 0.1% of the readings obtained by an accepted standard moisture content meter when the sample temperature was at room temperature (77°).

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In apparatus for determination of the amount of an ingredient exhibiting dielectric properties within a substantially homogeneous material, the combination comprising; a container for receiving and holding a sample of material to be tested, said container including at least a pair of electrodes and a pair of output terminals; oscillator means, including circuit means connected to said terminals and responsive to the capacitance thereacross for variably affecting the frequency of said oscillator means in accordance therewith and further variable capacitor means connected to said circuit means for affecting the frequency of said oscillator means; dial scale receiving means; adjusting means operatively connected to said capacitor means and to an indicator means, said indicator means being movable to a plurality of positions along said dial scale receiving means in response to the position of said adjustment means; a stationary indicator associated with said scale receiving means; removable scale means positioned in said scale receiving means and movable therein, said scale means including first and second scales and being constructed so that said first scale is in operative relationship with said movable indicator and said second scale is in operative relationship with said stationary indicator; and means for indicating the deviation of said oscillator from a predetermined frequency whereby the position of said movable indicator with respect to first scale is indicative of variations in frequency of said oscillator means in accordance with the capacitance of said container.

2. In apparatus of the class above described; oscillator means having a frequency determining circuit including at least one adjustable capacitor means and a capacitance test cell for receiving and containing a sample of material containing an ingredient having dielectric properties; driving means operatively connected to vary the capacitance of said capacitor means; movable indicator means, also connected to said driving means, so that the position thereof is indicative of the position of said driving means; stationary indicator means, a dial card including a pair of related graduated scales thereon for coaction with said movable and stationary indicator means; stationary mounting means for movably holding said dial card in predetermined relationship with said stationary and said movable indicator means whereby said dial card may be positioned in accordance with a measured variable with respect to said stationary indicator and one of said scales and said movable indicator may be positioned in accordance with the position of said driving means along the other of said scales.

3. In apparatus for determining the content of an ingredient having dielectric properties in material to be examined, a housing, a capacitance test cell stationarily associated with the housing, and first means for measuring the capacitance of the cell, the improvement comprising a dial card having at least a graduated temperature scale, second means in the housing for movably receiving said dial card from outside the housing and being operatively connected to the first means for indicating the measurement on the dial card, and means for calibrating the test cell and the first and second means to said dial card including calibration of the second means to one of the temperature graduations wherein the capacitance and said first means together have a median value of capacitance in a predetermined range of capacitance.

4. In apparatus for determining the content of an ingredient having dielectric properties in a material to be examined, capacitance forming electrodes, a capacitance meter including means for measuring and indicating the capacitance intermediate said electrodes and tunable over a predetermined range of capacitance with respect to said capacitance, the improvement comprising a detachable dial, a dial assembly on the meter including a dial slide, a vertical narrow reference line having a first coefficient of reflection on a background having a substantially different coefficient of reflection and both stationarily associated with the dial slide, the dial having a temperature scale with a narrow slit extending longitudinally therewith and an ingredient content scale disposed in spaced parallel relation to the temperature scale, said dial being movably insertable between the dial slide and the capacitance indicating means whereby said ingredient content scale is in operative relationship with said indicating means and a portion of the vertical line is visible through the slit for alignment with a graduation on the temperature scale.

5. In apparatus of the class above described wherein the amount of an ingredient having dielectric properties present in a material sample is to be determined by a measurement device including a housing having a front panel, and an adjustable means, including a tuning means therefor, for determining the total capacitance of a test cell and material contained therein, the improvement comprising; mounting means for slidably receiving a removable graduated scale dial card, said mounting means also including a light reflecting stationary indicator and a movable indicator, adjusting means operatively connected to said capacitance determining means and to said movable indicator for positioning the same to indicate the capacitance of said test cell; and a calibrating index positioned in predetermined relationship with one of the scales on said card whereby said tuning means may be utilized to initially calibrate the capacitance determining means to the removable card positioned in said mounting so that the movable indicator is positioned substantially in the median position of a predetermined range of capacitance determination.

References Cited in the file of this patent

UNITED STATES PATENTS

| | | |
|---|---|---|
| 1,551,623 | Sackett | Sept. 1, 1925 |
| 1,612,590 | Lucka et al. | Dec. 28, 1926 |
| 1,826,247 | Heppenstall | Oct. 6, 1931 |
| 1,850,589 | Tourneau | Mar. 22, 1932 |
| 2,185,202 | Kuhlman | Jan. 2, 1940 |
| 2,251,641 | Stein | Aug. 5, 1941 |
| 2,285,421 | Dunmore | June 9, 1942 |
| 2,423,103 | Koechlin | July 1, 1947 |
| 2,526,636 | Colman | Oct. 24, 1950 |
| 2,693,575 | Greenwood et al. | Nov. 2, 1954 |
| 2,759,148 | Store | Aug. 14, 1956 |
| 2,759,149 | Hart | Aug. 14, 1956 |

FOREIGN PATENTS

| | | |
|---|---|---|
| 440,966 | Great Britain | Jan. 9, 1936 |
| 625,024 | Great Britain | June 21, 1949 |

OTHER REFERENCES

Griffin: "A Frequency-Checking Superhet," QST, April 1939, pages 38–41 and 88.

Graham: "Frequency Measurement Adapter," Radio and TV News, August 1955, pages 44, 91 and 92.